Jan. 2, 1962 R. T. SCHULTZ ETAL 3,015,736

TRIGGER CIRCUIT

Filed Dec. 5, 1957

Inventors
ROBERT T. SCHULTZ
JOHN F. SULLIVAN
By Philip M. Bolton
Attorney

United States Patent Office 3,015,736

Patented Jan. 2, 1962

3,015,736

TRIGGER CIRCUIT

Robert T. Schultz, Glendora, Calif., and John F. Sullivan, Bloomfield, N.J., assignors to International Telephone and Telegraph Corporation, Nutley, N.J., a corporation of Maryland Filed Dec. 5, 1957, Ser. No. 707,839

8 Claims. (Cl. 307—88.5)

This invention relates to a trigger circuit and more particularly to a trigger circuit of the type comprising a short-circuit stable negative-resistance device with an inductor connected across its terminals, such as a point-contact transistor circuit with an inductor coupled between the base terminal and a reference point (ground).

Trigger circuits are known using negative-resistance devices which, between a pair of terminals, have a voltage-current characteristic with first and third regions of positive resistance separated by a second region of negative resistance. The device may be short-circuit stable, characterized by a reversal of current in the transition between regions; or open-circuit stable, characterized by a reversal of voltage in the transition between regions. These devices may be made bistable, monostable or astable by connecting appropriate impedance and bias sources across their terminals. One common form of negative-impedance device is obtained by a circuit including a point-contact transistor. To obtain a short-circuit stable device the terminals are coupled to the base electrode and ground, respectively. To obtain a monostable or astable characteristic with a short-circuit stable device such as a base-connection transistor circuit, an inductor may be included in the circuit across the terminals to form a quasi-open circuit. These circuits generate pulses having a width determined by the time required to traverse one of the positive resistance regions.

One difficulty experienced with these circuits is that the transistor characteristics vary from unit to unit of one type and that even with any given transistor, the characteristics vary according to ambient conditions such as temperature. This causes the slopes and the transition points of the voltage-current characteristic of the device to vary, and thereby cause variations of pulse widths. Various arrangements have been tried to stabilize trigger circuits using these devices, such as, including diodes at various points in the circuit. However, these techniques have not been entirely satisfactory.

The principal object of this invention is to provide a trigger circuit where the pulse width is relatively independent of the transistor characteristics.

According to the invention, the pulse width of a trigger circuit comprising a short-circuit stable negative-resistance device with an inductor in the circuit across the terminals is stabilized by providing the inductor with a magnetization characteristic such that it saturates at a value of current within the positive resistance region which determines the pulse width. Therefore, the time for traversing such region is determined principally by the high inductance value at the current values below saturation, and the time for traversing the remainder of the region at the lower inductance value after the current exceeds the saturation value is negligible.

If the circuit is made monostable by the appropriate choice of bias voltage and resistance in the base connection, a trigger pulse may be applied to the base terminal to initiate each pulse cycle.

In the preferred forms of the invention the negative-resistance device includes a point contact transistor, and the inductor is coupled in circuit between the base terminal and the ground point.

In one preferred embodiment of the invention, a unidirectional device such as a diode is connected between the base electrode and the terminal coupled to the inductor to further stabilize the circuit.

Other features reside in including a resistor between the emitter terminal and ground, and taking the output pulses from the emitter electrode.

Still another feature resides in providing a bias winding on the inductor to provide an arrangement for varying the value of the saturation current to thereby vary the pulse width.

The foregoing and other objects and features of this invention and the manner of attaining them will become more apparent and the invention itself will be best understood by reference to the following description of embodiments of the invention taken in conjunction with the accompanying drawings comprising FIGS. 1 to 6, wherein.

Figure 1:
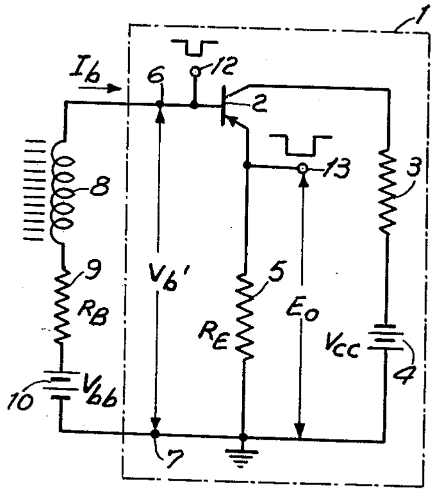
FIG. 1 is a schematic diagram of a transistor trigger circuit.

Referring to FIG. 1, the negative impedance device 1 comprises a point-contact transistor 2 with a resistor 3 and battery 4 connected in series between the collector electrode and ground, and a resistor 5 connected between the emitter electrode and ground. The terminals 6 and 7 are connected to the base electrode and ground, respectively. Between terminals 6 and 7 an inductor 8, a resistor 9 and a bias source 10 are connected in series.

Figure 2:
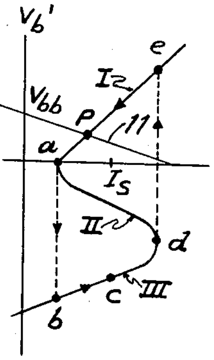
FIG. 2 is a graph showing the voltage-current characteristic of the arrangement shown in FIG. 1.

The characteristic of the voltage $V_b'$ vs. the current $I_b$ between terminals 6 and 7 of device 1 is shown in FIG. 2 by the curve having a positive resistance region I at cut-off, a negative resistance region II, and a positive resistance region III at saturation. Resistor 9 and bias source 10 establish a load line 11 on this voltage-current characteristic, the values being determined to establish a stable quiescent point at a point P. This circuit is monostable.

A trigger pulse may be applied at a terminal 12, FIG. 1, coupled to the base electrode. The pulses must be of sufficient value to move the voltage beyond point *a* on the curve, FIG. 2. Since the inductor 8 prevents an instantaneous change of current, the voltage jumps to a point *b* in region III. The current then increases while magnetizing inductor 8 unit it reaches point *d*, and then jumps to point *e* in region I. The current decreases, demagnetizing inductor 8, until point P is reached, and the circuit is ready to be triggered for another cycle. Output pulses may be taken from terminal 13 connected to the emitter electrode. The rectifying properties of the emitter junction cause the emitter potential to follow the base potential when negative, but to block when the base is positive. Therefore, an output pulse is obtained which has a steep rise during the time *a*–*b*, has a top corresponding to the time *b*–*d* and then has a steep decline to zero. The time from *e* to *p*, during which the output voltage is substantially zero, is the recovery time.

Further information concerning trigger circuits of this type may be found in several articles in the issue of the "Proceedings of the IRE," volume 40, No. 11, November 1952. See, for example, an article by A. E. Anderson, "Transistors in Switching Circuits," pages 1541 to 1558. A helpful method of understanding how the voltage-current characteristic of FIG. 2 is obtained may be found in chapter 18 of a text by R. F. Shea, "Principles of Transistor Circuits," Wiley, 1953. An equivalent circuit of the type shown in Shea's FIG. 18.7 is particularly helpful.

Analysis shows that the slope of the voltage-current characteristic of device 1 is equal to $$[R_b+(R_e+R_E)/(1-\alpha)]$$

where $R_b$ and $R_e$ are the internal base and emitter-junction resistances, respectively, and $R_E$ is the value of the external emitter resistor 5. Alpha ($\alpha$) is approximately the ratio of an increment of collector current to an increment of emitter current, and depends upon the D.C. value of the emitter current. In region II, alpha is about 2.0 to 2.5, $R_e$ is the forward emitter-junction resistance, and the resulting slope is negative. In regions I and III, alpha becomes zero, and the slope is positive with a value of $(R_b+R_e+R_E)$. The emitter-junction resistance $R_e$ is the reverse value in cutoff region I, and the forward value in saturation region III.

Figure 3:
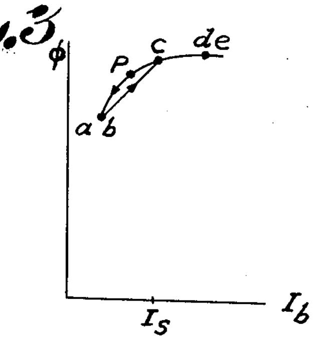
FIG. 3 is a graph of the magnetization curve for the inductor in FIG. 1.

A difficulty with trigger circuits of the general type shown in FIG. 1 is that the transition points and slopes of the voltage-current characteristic vary according to the characteristics of the transistor. The exact values at which points P and *d* occur depends upon the transistor characteristics and, therefore, the trigger characteristic and pulse width will vary. According to the invention, the pulse width is stabilized by providing an inductor 8 having a magnetization characteristic such as that shown in FIG. 3, where the flux is plotted against the current $I_b$. The inductor saturates at a value of current $I_S$ corresponding to point *c* in region III. Therefore, between points *b* and *c* the inductor has a high value of inductance and between points *c* and *d* it has a low value of inductance. Since the time constant is determined by the inductance divided by the slope of the curve III, a relatively large time will be required to traverse the curve from *b* to *c*, and the time from *c* to *d* will be negligible. Therefore, the pulse width is determined by the highly stable time required to magnetize inductor 8 from point *b* to point *c*, and the exact location of point *d* is relatively unimportant. The slope in region III is stabilized by inserting the external emitter resistance $R_E$, choosing a value which is large compared to $(R_b+R_e)$. The points shown in FIG. 3 correspond to the similarly designated points on the curve in FIG. 2.

Figure 4:
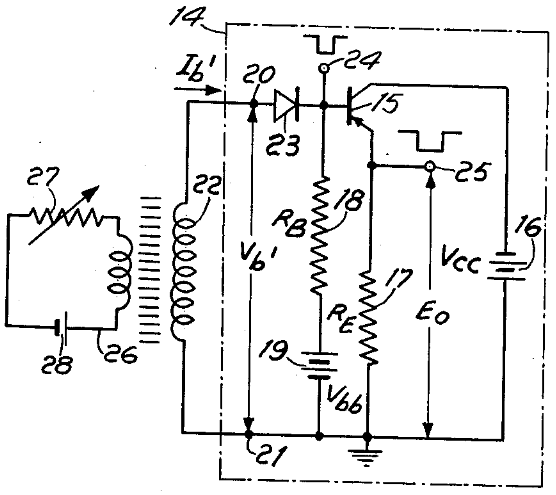
FIG. 4 is a schematic diagram of an alternative transistor trigger circuit.

FIG. 4 shows an alternative embodiment comprising a negative-impedance device 14 having a point-contact transistor 15, with the collector electrode connected through a bias source 16 to ground, the emitter terminal connected through resistor 17 to ground, and the base electrode connected through a resistor 18 and bias source 19 to ground. The terminals 20 and 21 are coupled to the base electrode and ground, respectively. An inductor 22 is connected between terminals 20 and 21. A diode 23 is connected between the base electrode and terminal 20 to further stabilize this trigger circuit.

Figure 5:
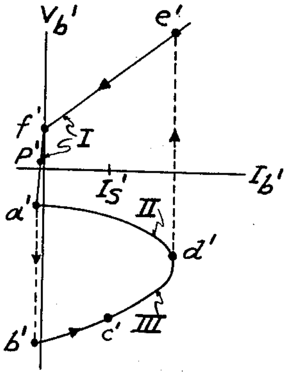
FIG. 5 is a graph of the voltage-current characteristic of the arrangement shown in FIG. 4.

The characteristic of voltage $V_b'$ vs. the current $I_b'$ of device 14 between terminals 20 and 21 is shown in FIG. 5. This curve is similar to that shown in FIG. 2 except that, since the base bias resistor 18 and battery 19 are included within the device 14, the voltage axis is moved to the right; and because of diode 23, current $I_b'$ does not go substantially negative. Since in the quiescent condition there can be no substantial drop across inductor 22, the point P′ is located near zero voltage. Therefore, the triggering characteristics are more stable and the output pulse has a definite starting point P′ near zero current.

The operation of this circuit is similar to that of FIG. 1. A trigger pulse is applied at terminal 24 and an output pulse is taken from the emitter electrode at terminal 25. Each time a trigger pulse is applied, the pulse cycle follows the points P′, *a′*, *b′*, *c′*, *d′*, *e′*, *f′* and back to P′.

Figure 6:
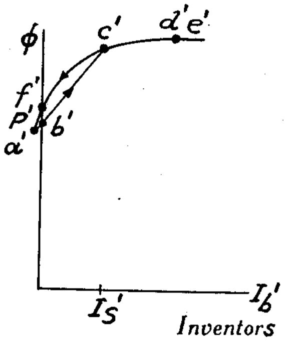
FIG. 6 is a graph of the magnetization curve for the inductor in FIG. 4.

An inductor 22 is provided which saturates at a current $I_S'$ within region III, as shown by the magnetization curve in FIG. 6. The pulse width is determined by the high inductance portion of the cycle *b′–c′*, the time for traversing the low inductance portion of the cycle *c′–d′* being negligible.

According to a further feature of the invention, inductor 22 is provided with a bias winding 26 supplied by an adjustable current source, such as a variable resistor 27 and a battery 28, to control the value of current $I_S'$ through the winding 22 at which the core saturates. Therefore, the pulse width may be controlled by controlling the value of the bias current as by adjusting resistor 27. It is of course obvious that a similar bias winding could be added to inductor 8 in FIG. 1.

In the trigger circuit of FIG. 4, the batteries 16 and 19 may supply 22 volts each, and resistor 18 may have a value of 6800 ohms. The inductor 22 may be wound with 3000 turns in the principal winding and 1000 turns in the bias winding 26, on a 5340 S–1 Supermalloy core obtainable from Arnold Engineering Company. The emitter resistor 17 may have a value of 1000 to 2200 ohms, a larger output power being available with the smaller resistance value.

While we have described above the principles of our invention in connection with specific apparatus, it is to be clearly understood that this description is made only by way of example and not as a limitation to the scope of our invention as set forth in the objects thereof and in the accompanying claims.

We claim:

1. A trigger circuit for generating pulse signals comprising a negative resistance circuit including a transistor having a base electrode, an emitter electrode and a collector electrode, said transistor having a current amplification factor alpha greater than unity, a reference potential, a source of bias voltage coupled between said reference potential and said collector electrode, and means coupling said emitter electrode to said reference potential; a saturable inductor coupled between said base electrode and said reference potential; a trigger input connected to said base electrode to initiate a pulse cycle for the generation of said pulse signals; said saturable inductor saturating at a given value of current within each pulse cycle, the pulse width of said pulse signals being determined by the time required for said saturable inductor to reach saturation; and means coupled to said emitter electrode to remove said generated pulse signals.

2. A trigger circuit for generating pulse signals comprising a negative resistance circuit including a transistor having a base electrode, an emitter electrode and a collector electrode, said transistor having a current amplification factor alpha greater than unity, a reference potential, a source of bias voltage coupled between said reference potential and said collector electrode, and means coupling said emitter electrode to said reference potential; a saturable inductor coupled between said base electrode and said reference potential; a trigger input connected to said base electrode to initiate a pulse cycle for the generation of said pulse signals; said saturable inductor saturating at a given value of current within each pulse cycle, the pulse width of said pulse signals being determined by the time required for said saturable inductor to reach saturation; means coupled to said emitter electrode to remove said generated pulse signals; and means coupled to said saturable inductor to adjust the pulse width of said pulse signals.

3. A trigger circuit according to claim 2, wherein said means to adjust includes a direct current biased winding inductively coupled to said saturable inductor to control the time required for said saturable inductor to reach saturation.

4. A trigger circuit for generating pulse signals comprising a negative resistance circuit including a transistor having a base electrode, an emitter electrode and a collector electrode, said transistor having a current amplification factor alpha greater than unity, a reference potential, a first source of bias voltage, means to couple one terminal of said first source to said reference potential, a first resistor coupling the other terminal of said first source to said collector electrode, and a second resistor coupling said emitter electrode to said reference potential; a saturable inductor having one end thereof coupled to said base electrode; a third resistor and a second source of bias voltage coupled in series relationship between the other end of said saturable inductor and said reference potential; a trigger input connected to said base electrode to initiate a pulse cycle for the generation of said pulse signals; said saturable inductor saturating at a given value of current within each pulse cycle, the pulse width of said pulse signals being determined by the time required for said saturab'e inductor to reach saturation; and an output terminal coupled to said emitter electrode to remove said generated pulse signals.

5. A trigger circuit generating pulse signals comprising a negative resistance circuit including a transistor having a base electrode, an emitter electrode and a collector electrode, said transistor having a current amplification factor alpha greater than unity, a reference potential, a first source of bias voltage, means to couple one terminal of said first source to said reference potential, a first resistor coupling the other terminal of said first source to said collector electrode, and a second resistor coupling said emitter electrode to said reference potential; a saturable inductor having one end thereof coupled to said base electrode; a third resistor and a second source of bias voltage coupled in series relationship between the other end of said saturable inductor and said reference potential; a trigger input connected to said base electrode to initiate a pulse cycle for the generation of said pulse signals; said saturable inductor saturating at a given value of current within each pulse cycle, the pulse width of said pulse signals being determined by the time required for said saturable inductor to reach saturation; and means coupled to said saturable inductor to adjust the pulse width of said pulse signals.

6. A trigger circuit for generating pulse signals comprising a negative resistance circuit including a transistor having a base electrode, an emitter electrode and a collector electrode, said transistor having a current amplification factor alpha greater than unity, a reference potential, a first source of bias voltage coupled between said reference potential and said collector electrode, a first resistor coupling said emitter electrode to said reference potential, and a second source of bias voltage and a second resistor coupled in a series relationship between said base electrode and said reference potential; a saturable inductor having one end thereof coupled to said reference potential; a diode coupling the other end of said saturable inductor to said base electrode; a trigger input connected to said base electrode to initiate a pulse cycle for the generation of said pulse signals; said saturable inductor saturating at a given value of current within each pulse cycle, the pulse width of said pulse signals being determined by the time required for said saturable inductor to reach saturation; and an output terminal coupled to said emitter electrode to remove said generated pulse signals.

7. A trigger circuit for generating pulse signals comprising a negative resistance circuit including a transistor having a base electrode, an emitter electrode and a collector electrode, said transistor having a current amplification factor alpha greater than unity, a reference potential, a first source of bias voltage coupled between said reference potential and said collector electrode, a first resistor coupling said emitter electrode to said reference potential, and a second source of bias voltage and a second resistor coupled in a series relationship between said base electrode and said reference potential; a saturable inductor having one end thereof coupled to said reference potential; a diode coupling the other end of said saturable inductor to said base electrode; a trigger input connected to said base electrode to initiate a pulse cycle for the generation of said pulse signals; said saturable inductor saturating at a given value of current within each pulse cycle, the pulse width of said pulse signals being determined by the time required for said saturable inductor to reach saturation; and means coupled to said saturable inductor to adjust the pulse width of said pulse signals.

8. A trigger circuit according to claim 7, wherein said means to adjust includes a series circuit having a third source of bias voltage, a third resistor and a winding inductively coupled to said saturable inductor to control the time required for said saturable inductor to reach saturation.

References Cited in the file of this patent

UNITED STATES PATENTS

| | | |
|---|---|---|
| 2,695,993 | Haynes | Nov. 30, 1954 |
| 2,798,169 | Eckert | July 2, 1957 |
| 2,808,990 | Van Allen | Oct. 8, 1957 |
| 2,809,303 | Collins | Oct. 8, 1957 |
| 2,830,199 | Mofenson | Apr. 8, 1958 |
| 2,850,236 | Schaefer et al. | Sept. 2, 1958 |

OTHER REFERENCES

Van Allen publication, "Four Quadrant Multiplication With Transistors and Magnetic Cores," November 1955, published in Transactions of the AIEE, pages 643–8.

Schaefer et al.: Publication, "Transcendental Function Analogue Computation With Magnetic Cores," May 1956, published in Transactions of the AIEE, pages 160–165.

Keister publication, "Transistor Magnetic Analog Multiplier," October 1956 in Electronics, pages 160–163.

Shea publication, "Prin. of Transistor Circuits," published by John Wiley & Son, New York, Sept. 15, 1953, pages 169–176.